United States Patent
Upadhye et al.

(10) Patent No.: US 11,088,839 B2
(45) Date of Patent: Aug. 10, 2021

(54) GENERATING A PLURALITY OF ONE TIME TOKENS

(71) Applicant: IPCO 2012 LIMITED, London (GB)

(72) Inventors: Nilesh Upadhye, London (GB); Robert Boothby, London (GB)

(73) Assignee: IPCO 2012 Limited, London (GB)

( * ) Notice: Subject to any disclaimer, the term of this patent is extended or adjusted under 35 U.S.C. 154(b) by 331 days.

(21) Appl. No.: 16/311,026

(22) PCT Filed: Jun. 21, 2017

(86) PCT No.: PCT/GB2017/051818
§ 371 (c)(1),
(2) Date: Dec. 18, 2018

(87) PCT Pub. No.: WO2018/002585
PCT Pub. Date: Jan. 4, 2018

(65) Prior Publication Data
US 2020/0313891 A1    Oct. 1, 2020

(30) Foreign Application Priority Data

Jun. 30, 2016 (GB) ..................................... 1611388

(51) Int. Cl.
*H04L 29/06* (2006.01)
*H04L 9/32* (2006.01)
*G06Q 20/38* (2012.01)

(52) U.S. Cl.
CPC ......... *H04L 9/3228* (2013.01); *G06Q 20/385* (2013.01); *G06Q 20/3823* (2013.01); *H04L 63/0838* (2013.01)

(58) Field of Classification Search
CPC .............. H04L 9/3228; H04L 63/0838; G06Q 20/3823; G06Q 20/385
USPC ............................................................ 726/9
See application file for complete search history.

(56) References Cited

U.S. PATENT DOCUMENTS

| | | |
|---|---|---|
| 9,195,984 B1 | 11/2015 | Howard et al. |
| 2012/0036360 A1* | 2/2012 | Bassu .................. H04L 9/3234 713/168 |
| 2015/0310425 A1 | 10/2015 | Cacioppo |

OTHER PUBLICATIONS

PCT International Search Report, Application No. PCT/GB2017/051818, dated Sep. 1, 2017, 2 pps.

* cited by examiner

*Primary Examiner* — Michael S McNally
(74) *Attorney, Agent, or Firm* — Pramudji Law Group PLLC; Ari Pramudji

(57) ABSTRACT

A method of generating a plurality of different one time tokens, the method including acquiring a first numerical value from a predetermined sequence of consecutive numerical values, applying format preserving encryption to the acquired first numerical value to generate a first numerical one time token; acquiring a second numerical value from the predetermined sequence of consecutive numerical values, the acquired second numerical value being different to the acquired first numerical value, and applying the format preserving encryption to the acquired second numerical value to generate a second numerical one time token.

19 Claims, 6 Drawing Sheets

GENERATING A PLURALITY OF ONE TIME TOKENS

CROSS-REFERENCE TO RELATED APPLICATIONS

This patent application is a National Stage Entry of PCT/GB2017/051818 filed on Jun. 21, 2017, which claims the benefit and priority of Great Britain Patent Application No. 1611388.8 filed on Jun. 30, 2016, the disclosures of which are incorporated herein by reference in their entirety as part of the present application.

BACKGROUND

The present disclosure relates to generating a plurality of one time tokens.

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

It is known to use one time tokens (OTTs), also known as one time passcodes, one time passwords, or the like, as a security measure in a wide range of electronic systems. OTTs are single use codes which a user must enter in order for a particular security check to be passed. For example, in some online banking systems, whenever a user wishes to submit an electronic payment to a $3^{rd}$ party to whom the user has not submitted an electronic payment before, the user may be sent an OTT (via a means independent of the online banking system, such as via a mobile telephone or email address) which must be entered via the online banking system by the user in order for the electronic payment to be completed. There are also many other uses for OTTs, as is known in the art.

Once the OTT has been entered, the OTT is discarded and is not used again. This provides improved security, because even if the OTT is then compromised (for example, by an unauthorized person later gaining access to the user's email or mobile telephone to which the OTT was sent), it is no longer usable for authentication. When another security check is required at a later time (for example, if the user of an online banking system wishes to pay another new $3^{rd}$ party), then a completely new OTT will be generated. It is thus an important requirement for OTTs that they are unpredictable. That is, it must not be possible for new OTTs to be easily predicted from previous OTTs.

Current human facing OTT approaches (that is, approaches in which a new OTT is received and is then input by a human during an authentication process) are generally used in scenarios in which the OTT is used as a second factor of authentication (that is, the OTT is used in addition to another secure authentication technique). The implementations used are thus designed around this assumption. Implementations are built based on either time based synchronization using a device and an algorithm such as the 'Time-based One-Time Password Algorithm' (TOTP) or on a mathematical algorithm such as a Hash Chain. TOTP has to be implemented in a device such as a key fob (such as the RSA SecurID® key fob). The mathematical algorithm can either be implemented on a dedicated device or as a program that can be run on a general device such as a mobile phone (Nexus TruID® or PortWise®).

It is also often desirable for OTTs to be unique, that is, to be used only once and to then never be repeated. Such unique OTTs may be used, for example, in linking a plurality of devices when there is no prior information about the user of those devices. In this case, a unique OTT is used to link the devices, and is typically mediated by a server (as occurs with AirDroid®, for example). The OTT's uniqueness is typically handled by making it so rich that there is no chance of collisions (the OTT may embody several pieces of information such as the date, time, a device identifier, etc.) or by semi-randomly generating an OTT and performing collision detection (that is, whenever an OTT is semi-randomly generated, a check is performed so as to see whether that particular OTT has been used before—if it has been used before, then the OTT is discarded and a new OTT is semi-randomly generated). However, when the token is rich a human being is unlikely to be able to type it in. Other mechanisms such as (Quick Response) QR Codes or Bluetooth pairing must therefore be used to transmit it, adding complexity to the system. Also, when the token is semi-randomly generated, the need to perform collision detection results in increased processing overhead for the system. This increased processing overhead can make it difficult to use such OTT generation techniques on large scales.

BRIEF DESCRIPTION

In a first aspect, the present disclosure provides a method of generating a plurality of different one time tokens, the method including acquiring a first numerical value from a predetermined sequence of consecutive numerical values, applying format preserving encryption to the acquired first numerical value to generate a first numerical one time token, acquiring a second numerical value from the predetermined sequence of consecutive numerical values, the acquired second numerical value being different than the acquired first numerical value, and applying the format preserving encryption to the acquired second numerical value to generate a second numerical one time token.

In an embodiment, the format preserving encryption is applied to each of the first and second acquired numerical values using the same secret key.

In an embodiment, the predetermined sequence of consecutive numerical values includes a first predetermined subset of numerical values and a second predetermined subset of numerical values, each value in the second predetermined subset being different than each of the values in the first predetermined subset, the method including acquiring the first numerical value from the first predetermined subset and applying the format preserving encryption to the first numerical value using a first secret key to generate the first numerical one time token, and acquiring the second numerical value from the second predetermined subset and applying the format preserving encryption to the second numerical value using a second secret key to generate the second numerical one time token, wherein an identifier of the first secret key is applied to the first numerical one time token, and wherein an identifier of the second secret key is applied to the second numerical one time token, the identifier of the first secret key being different than the identifier of the second secret key.

In an embodiment, the identifier of the first secret key is a first numerical character and the identifier of the second secret key is a second numerical character, and the first numerical character is present at a predetermined character position of the first numerical one time token and the second numerical character is present at the same predetermined character position of the second numerical one time token.

In an embodiment, the numerical character at the predetermined character position is the same for each numerical value in the first predetermined subset and is equal to the first numerical character which serves as the identifier of the first secret key, the numerical character at the predetermined character position is the same for each numerical value in the second predetermined subset and is equal to the second numerical character which serves as the identifier of the second secret key, and the format preserving encryption is not applied to the numerical character at the predetermined character position of either the first numerical value acquired from the first predetermined subset or the second numerical value acquired from the second predetermined subset.

In an embodiment, the predetermined character position of the first numerical one time token at which the first numerical character, which serves as the identifier of the first secret key is present is an additional character position not present in the first numerical value acquired from the first predetermined subset, and the predetermined character position of the second numerical one time token at which the second numerical character, which serves as the identifier of the second secret key is present is an additional character position not present in the second numerical value acquired from the second predetermined subset.

In an embodiment, after acquiring the first numerical value from the first predetermined subset and applying the format preserving encryption to the first numerical value using the first secret key to generate the first numerical one time token, the first secret key is changed, and after acquiring the second numerical value from the second predetermined subset and applying the format preserving encryption to the second numerical value using the second secret key to generate the second numerical one time token, the second secret key is changed.

In an embodiment the predetermined sequence of consecutive numerical values is generated from a predetermined sequence of non-repeating alphabetic values, each numerical value in the predetermined sequence of consecutive numerical values being associated with a respective alphabetic value in the predetermined sequence of alphabetic values via a predetermined one-to-one relationship, and each of the first and second numerical one time tokens is converted to respective first and second alphabetic one time token using the predetermined one-to-one relationship.

In a second aspect, the present disclosure provides an apparatus for generating a plurality of different one time tokens, the apparatus including a controller operable to acquire, from a sequence generator, a first numerical value from a predetermined sequence of consecutive numerical values and to acquire, from the sequence generator, a second numerical value from the predetermined sequence of consecutive numerical values, the acquired second numerical value being different to the acquired first numerical value, and a format preserving encryptor operable to apply format preserving encryption to the acquired first numerical value to generate a first numerical one time token and to apply the format preserving encryption to the acquired second numerical value to generate a second numerical one time token.

In an embodiment, the format preserving encryption is applied to each of the first and second acquired numerical values using the same secret key.

In an embodiment, the predetermined sequence of consecutive numerical values includes a first predetermined subset of numerical values and a second predetermined subset of numerical values, each value in the second predetermined subset being different to each of the values in the first predetermined subset; the controller is operable to acquire the first numerical value from the first predetermined subset and the format preserving encryptor is operable to apply the format preserving encryption to the first numerical value using a first secret key to generate the first numerical one time token, and the controller is operable to acquire the second numerical value from the second predetermined subset and the format preserving encryptor is operable to apply the format preserving encryption to the second numerical value using a second secret key to generate the second numerical one time token, wherein an identifier of the first secret key is applied to the first numerical one time token, and an identifier of the second secret key is applied to the second numerical one time token, the identifier of the first secret key being different to the identifier of the second secret key.

In an embodiment, the identifier of the first secret key is a first numerical character and the identifier of the second secret key is a second numerical character, and the first numerical character is present at a predetermined character position of the first numerical one time token and the second numerical character is present at the same predetermined character position of the second numerical one time token.

In an embodiment, the numerical character at the predetermined character position is the same for each numerical value in the first predetermined subset and is equal to the first numerical character which serves as the identifier of the first secret key, the numerical character at the predetermined character position is the same for each numerical value in the second predetermined subset and is equal to the second numerical character which serves as the identifier of the second secret key, and the format preserving encryption is not applied to the numerical character at the predetermined character position of either the first numerical value acquired from the first predetermined subset or the second numerical value acquired from the second predetermined subset.

In an embodiment, the predetermined character position of the first numerical one time token at which the first numerical character which serves as the identifier of the first secret key is present is an additional character position not present in the first numerical value acquired from the first predetermined subset, and the predetermined character position of the second numerical one time token at which the second numerical character which serves as the identifier of the second secret key is present is an additional character position not present in the second numerical value acquired from the second predetermined subset.

In an embodiment, after the controller acquires the first numerical value from the first predetermined subset and the format preserving encryptor applies the format preserving encryption to the first numerical value using the first secret key to generate the first numerical one time token, the controller is operable to change the first secret key used, and after the controller acquires the second numerical value from the second predetermined subset and the format preserving encryptor applies the format preserving encryption to the second numerical value using the second secret key to generate the second numerical one time token, the controller is operable to change the second secret key used.

In an embodiment, the predetermined sequence of consecutive numerical values is generated from a predetermined sequence of non-repeating alphabetic values, each numerical value in the predetermined sequence of consecutive numerical values being associated with a respective alphabetic value in the predetermined sequence of alphabetic values via a predetermined one-to-one relationship, and the controller is operable to convert each of the first and second numerical one time tokens to respective first and second alphabetic one time token using the predetermined one-to-one relationship.

In a third aspect, the present disclosure provides a recording medium storing a computer program for performing a method according to the first aspect.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
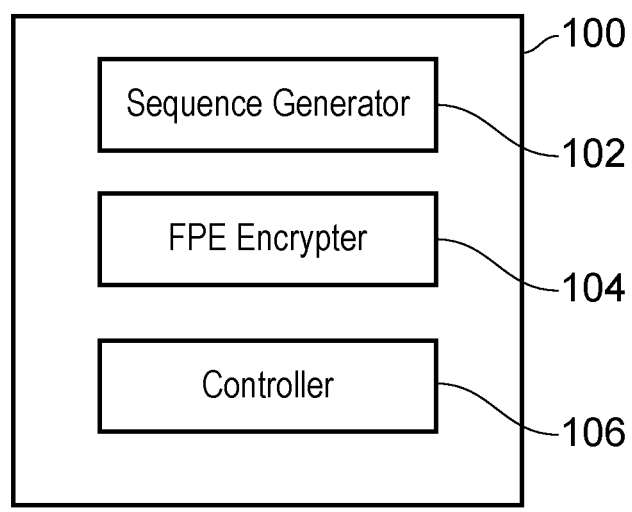
FIG. 1 schematically shows an one time token (OTT) generation device according to an embodiment of the present disclosure.

Referring now to the drawings, wherein like reference numerals designate identical or corresponding parts throughout the several views.

Embodiments of the present disclosure aim to allow the generation of unique one time tokens (OTTs) that are temporally unique, unpredictable to an external party and can be easily used on larger scales. The embodiments also aim to have the additional benefit of being able to generate OTTs of an arbitrary format which are human-friendly, so that additional features such as the use of QR codes to represent rich OTTs (for example) are not necessary, thus reducing the additional processing associated with such features.

FIG. 1 schematically shows an OTT generation device 100 according to an embodiment. The OTT generation device 100 includes a sequence generator 102, a Format Preserving Encryption (FPE) encryptor 104 and a controller 106. The operation of the sequence generator 102 and FPE encryptor 104 is controlled by the controller 106.

The sequence generator 102 generates unique numerical values for use in generating OTTs. For example, the sequence generator may use known database technology designed to provide a unique numeric identifier to any database record that needs it. Such techniques are highly scalable, and are used for allowing multiple sessions/servers to efficiently generate unique numeric identifiers with minimal contention and no chance of collisions. This may be achieved by using a predetermined list of consecutive numerical values, for example, in which whenever a new unique numeric identifier is required, the next consecutive numerical value in the predetermined list which has not yet been used is retrieved and is used as the new unique numeric identifier. The sequence generator 102 may thus use the same approach. That is, the sequence generator 102 generates a predetermined list of consecutive numerical values, and whenever a unique numerical value is required for the generation of an OTT, the next consecutive numerical value in the predetermined list which has not yet been used is retrieved and used as the unique numerical value. Thus, for example, if the previously retrieved value from the predetermined list as a unique numerical value was 012, then the unique numerical value will be 013, since this is the next consecutive numerical value in the predetermined list. A predetermined list of this type is known as a sequence.

The use of such a database-like sequence allows the generation of unique numerical values even when those values are to be distributed for use between a plurality of different servers or sessions. That is, the numbers generated by such a sequence are universally unique across all servers or sessions. Such a sequence can be implemented in a number of ways, but fundamentally a sequence has a central record of allocations of numeric ranges to a given session/server. So, for example, if a sequence runs from 0-999,999 and a first session needs to generate some unique numerical values, then that first session will ask for an allocation from the sequence and will be allocated a first subset of the unique numerical values of the sequence. For example, the first session may be allocated the values 0-999. The first session can then further allocate these unique numerical values for use as OTTs, depending on the function or purpose of the first session. Similarly, if a second session needs to generate some unique numerical values, then that second session will ask for an allocation from the sequence and will be allocated a second subset of the unique numerical values of the sequence. Each unique numerical value in the second subset is different to each unique numerical value in the first subset. Thus, for example, the second session may be allocated the values 1,000-1,999. The second session can then further allocate these unique numerical values for use as OTTs, depending on the function or purpose of the second session.

Figure 2:
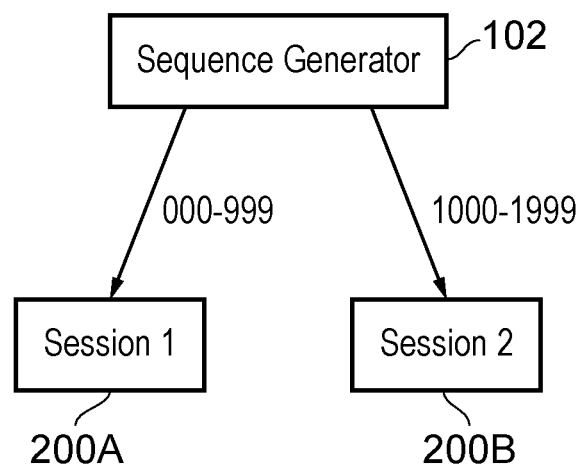
FIG. 2 schematically shows an arrangement in which a sequence generator respectively allocates different first and second subsets of numerical values of a sequence to a first and second session.

This arrangement is schematically illustrated in FIG. 2, which shows how the sequence generator 102 may allocate the different first and second subsets of numerical values of the sequence to, respectively, the first session 200A and second session 200B. Because of this arrangement, the second session can allocate its assigned numerical values for use as OTTs without any chance of collision with the numerical values assigned to the first session for use as OTTs, even though the numerical values are obtained from the same overall sequence generated by the sequence generator 102. It is noted that the only time there is any additional overhead to such a sequence scheme is when a plurality of sessions request a fresh allocation at once. In this case, the requests may have to be queued, for example. It is also noted that by tuning the size of the allocation (for example, by deciding on the number of unique numerical values in the overall sequence, the number of unique numerical values in a given subset, etc.), it is possible to scale this process across an arbitrarily large number of independent sessions/servers.

Thus, it can be seen that the use of a sequence in the way described to generate OTTs ensures that each OTT is unique (that is, not repeated), even when different servers or sessions are acquiring numerical values for use as OTTs from the same sequences of numerical values. The drawback to this approach, however, is that the numbers are at least partially predictable with very little information about prior tokens. That is, if someone knows that a sequence is being used and that the previous OTT generated at the first session was, say, 098, then they can easily guess that the next OTT generated by the first session will be 099. In this case, since the first session has been allocated values 000-999, this guess would be correct. Such OTTs are therefore not very secure.

In order to improve the security of the generated OTTs, in an embodiment of the present disclosure, the unique numerical values obtained from the sequence are not used directly as an OTT. Rather, Format Preserving Encryption (FPE) is applied to each unique numerical value obtained from the sequence, and it is the output of the FPE which is used as the OTT. It is known to use FPE in environments in which sensitive data in a particular format is held and an encrypted representation of that data in the same format is needed. For example, the Permanent Account Number (PAN) of credit cards is often encrypted to the same format so that it can safely be passed through less secure systems without needing to alter those systems (so, for example, a 16 digit plain text PAN number will be encrypted using FPE so as to generate an encrypted PAN number which is also 16 digits). There are a number of known implementations of FPE, but they all have the same property of reversibly encrypting a value to the same format using a secret key (FPE must be reversible so that the sensitive data which is encrypted can be re-obtained via decryption).

It is important to note that implicit in any arbitrary format of data there is an arbitrary range of values, and that FPE applied to that data will again generate each value in that arbitrary range. For example, if the data is in a format such that the values of the data range from 0 to 999, then FPE will encrypt these data values to produce encrypted output values in the range 0 to 999. Similarly, if the data is in a format such that the values of the data range from AAA to ZZZ, then FPE will encrypt these data values to produce encrypted output values in the range AAA to ZZZ. This latter example works because each alphabetic character value in the range AAA to ZZZ can be represented as a number in the range 0 to $26^3-1$. This number is encrypted using FPE (to generate another number in the range 0 to $26^3-1$) and is then converted back to the alphabetic character representation.

In an embodiment of the present disclosure, the unique numerical values obtained from a sequence are encrypted using FPE in order to generate an OTT. By using FPE in this way, there is a guarantee of no collisions because for FPE to work the output of encrypting a set of unique values also has to be a set of unique values. This is required because FPE is designed to be reversible—it is not possible to have two input values encrypted to produce the same output value, since it would then not be possible to decrypt the output value to obtain a single input value. Thus, if each input to the FPE algorithm is unique then each output of the FPE algorithm will also be unique. In other words, there is a one-to-one relationship between the possible input values to an FPE algorithm and the output values of that FPE algorithm. The OTTs generated by performing FPE on the unique numerical values obtained from a sequence are therefore non-repeating and, because they have been produced by encryption, are not easily predictable.

Figure 3:
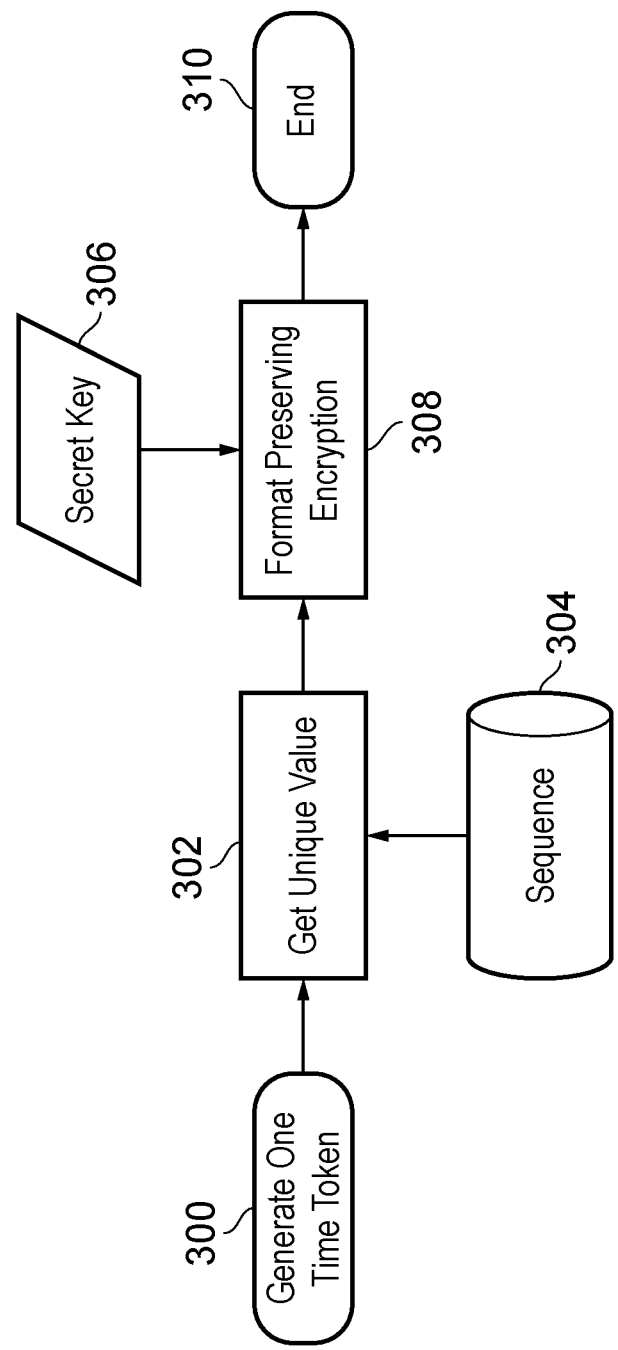
FIG. 3 schematically shows a process of generating an OTT according to an embodiment of the present disclosure.

A process of generating an OTT according to the above-mentioned disclosure is schematically illustrated in FIG. 3. This process is carried out by the OTT generation device 100. The process starts at step 300. At step 302, the controller 106 obtains a unique numerical value from a sequence 304. The sequence 304 is generated by the sequence generator 102. At step 308, FPE is applied to the obtained unique numerical value by the FPE encryptor 104. The FPE encryptor 104 uses a suitable FPE encryption algorithm using a secret key 306 (examples of which are known in the art). The secret key 306 determines particular one-to-one relationship between input and output values of the FPE algorithm (in other words, the secret key 306 determines the one-to-one mapping between input values and output values, with different secret keys resulting in a different one-to-one mapping). The FPE encrypted unique numerical value is then output as the OTT. The process then ends at step 310.

The arrangement of FIG. 3 has the benefit of being a simple implementation. However, it does have limitations. For example, once the sequence has reached the end of its range (for example, if the sequence has a range from 0 to 999 and the numerical value 999 is reached) then it will repeat itself (returning to 0, for example), leading to the same set of OTTs being produced in the same order. This can be overcome by making the range of the sequence sufficiently large that there is no chance of repetition in the whole lifespan of the service that is using it. However this leads to tokens that may be too large or unwieldy for human usage without mechanisms such as QR Codes, Bluetooth etc. Alternatively, if the OTTs only need to be unique for a given period of time (after which the same OTT can be used again), then the secret key could be regularly changed so as to try to prevent the predictability of the OTTs. However, this is an undesirable solution because using a new key reintroduces the risk of OTTs being repeated before it is acceptable for this to happen. This problem is schematically illustrated in FIG. 4.

Figure 4:
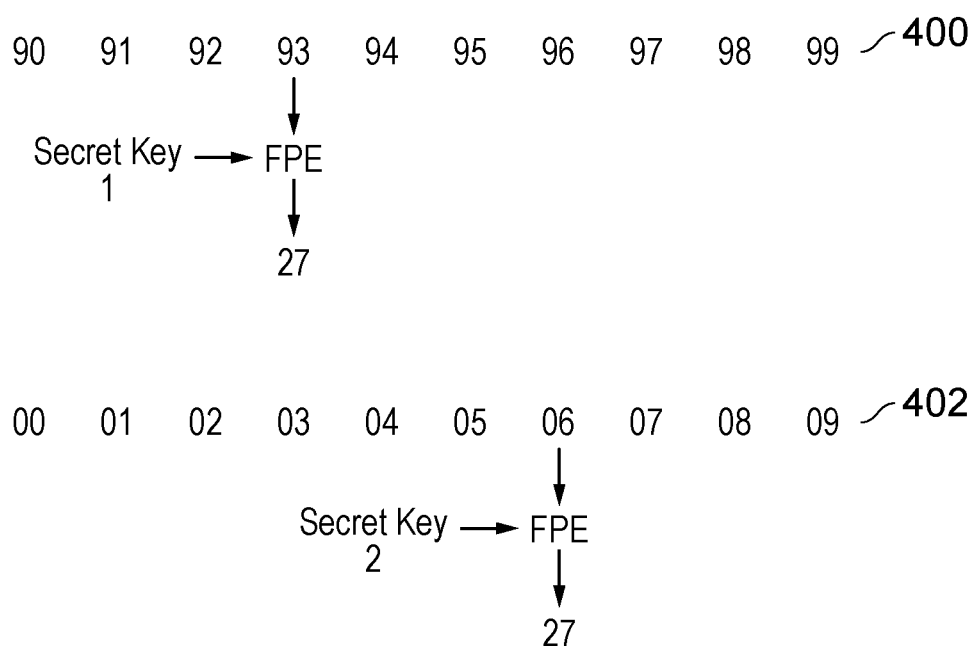
FIG. 4 schematically illustrates a problem in which an OTT is repeated and may therefore cause a collision.

The first row 400 of FIG. 4 shows the final ten sequence values of a sequence ranging from 0 to 99. These values are acquired from the sequence generator 102 during a first cycle of the sequence in which a first secret key (Secret Key 1) is used for the FPE encryption. Using Secret Key 1, the resulting FPE input to output mapping results in the input value 93 being converted to the output value 27. The second row 402 of FIG. 4 shows the first ten sequence values of the sequence ranging from 0 to 99. These values are the first values acquired from the sequence generator 102 during a second cycle of the sequence in which a second secret key (Secret Key 2) is used for the FPE encryption. Secret Key 2 is different to Secret Key 1 and therefore the resulting FPE input to output mapping is different. In this case, it is the input value 06 which is converted to the output value 27. This is undesirable, because the output value 27 has already been used very recently, and thus there is a danger of collision.

Figure 5:
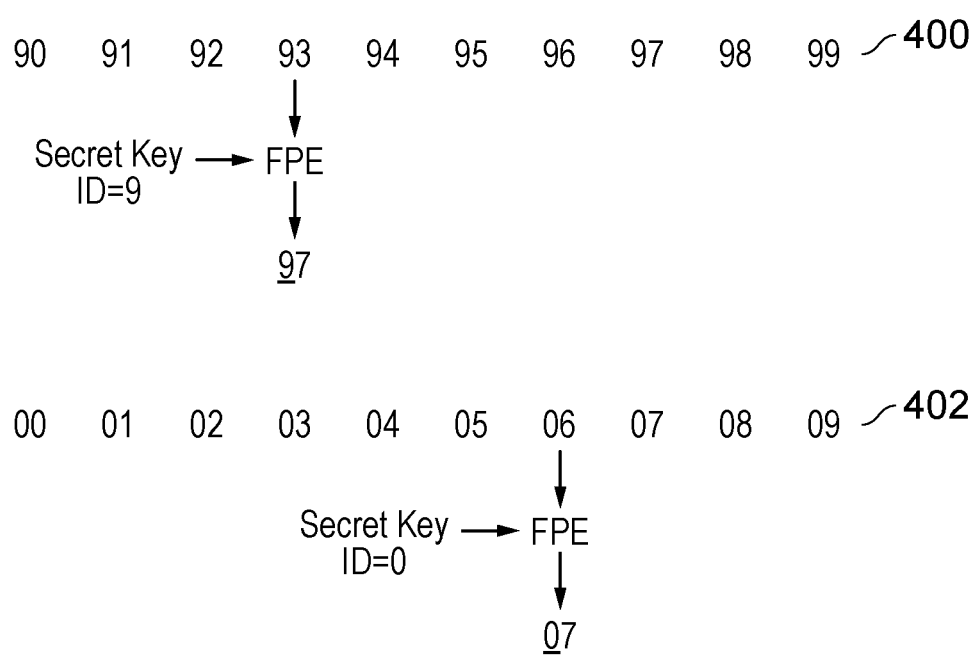
FIG. 5 schematically illustrates an arrangement in which the chance of repetition and collision of OTTs is reduced, according to an embodiment of the present disclosure.

In order to alleviate this problem, in an embodiment of the present disclosure, a different secret key is used for different portions of the sequence. Each key is identified by a different respective predetermined identifier. For example, if there are N different keys, than each key is allocated the respective identifier 1, 2, 3, . . . , N. The identifier of a particular key is then included in OTTs generated using that key, meaning that OTTs generated using different keys will always be different at least by virtue of the different identifiers of the keys used to generate them. This reduces the chance of the same OTTs being repeated too early, as schematically illustrated in FIG. 5.

FIG. 5 again shows the first row 400 showing the final ten sequence values of a sequence ranging from 0 to 99. These final ten sequence values represent a portion of the sequence in which a first secret key with an identifier (ID) equal to 9 is used for the PFE encryption. For the purpose of illustration, this first secret key is the same first secret key (Secret Key 1) used for the first row 400 in FIG. 4. Using this first secret key, the resulting input to output mapping results in the input value 93 being converted to the output value 97 rather than 27 (as before). This is because the ID of the first secret key (ID=9) has been included in the output value in the character position of the '2' in the value '27' which was previously generated using the FPE encryption with the first secret key. It is the output value 97 which is then used as the OTT.

FIG. 5 also again shows the second row 402 showing the first ten sequence values of the sequence ranging from 0 to 99. These first ten sequence values represent a portion of the sequence in which a second secret key with an identifier (ID) equal to 0 is used for the FPE encryption. For the purpose of illustration, this second secret key is the same second secret key (Secret Key 2) used for the second row 402 in FIG. 4. Using this second secret key, the resulting input to output mapping results in the input value 06 being converted to the output value 07 rather than 27 (as before). This is because the ID of the first secret key (ID=0) has been included in the output value in the character position of the '2' in the value '27' which was previously generated using the FPE encryption with the secret key. It is the output value 07 which is then used as the OTT. The problem of collision is therefore avoided, since the repeated OTT '27' has now been replaced with the non-repeating OTTs '97' and '07'.

In order to obtain an OTT including the ID of the secret key used to generated the OTT using FPE encryption, a numerical character of the input value from the sequence may be left unencrypted, for example. It is the remaining characters which are then encrypted using FPE encryption. Thus, for example, given the input value '0963' (it will be appreciated that, for ease of explanation, the examples of FIGS. 4 and 5 use only input numerical values from the sequence with two numerical characters—in reality, an OTT is likely to have more than two numerical characters, hence the example '0963' with four numerical characters given here, which could be generated from a sequence ranging from 0 to 9999, for example) which is in a portion of the sequence which is assigned a secret key with ID=0, then the value 0 (which is indicative of the secret key ID) is left unencrypted whilst FPE encryption is then applied to the remaining three numerical characters '963'.

In the case of input value '0963', the sequence may, for example, range from 0 to 9999 and be divided into ten portions ranging from 000-999 (portion 0, with secret key ID=0), 1000-1999 (portion 1, with secret key ID=1), 2000-2999 (portion 2, with secret key ID=2), 3000-3999 (portion 3, with secret key ID=3), 4000-4999 (portion 4, with secret key ID=4), 5000-5999 (portion 5, with secret key ID=5), 6000-6999 (portion 6, with secret key ID=6), 7000-7999 (portion 7, with secret key ID=7), 8000-8999 (portion 8, with secret key ID=8), and 9000-9999 (portion 9, with secret key ID=9). In this case, the numerical character in the leftmost character position of each input value from the sequence is equal to the secret key ID used for the portion of the sequence in which that input value is found, and therefore it is the character in this leftmost character position which is left unencrypted. The numerical characters in the remaining three character positions are therefore the only characters which must be subject to the FPE encryption. It is noted that FPE encryption with a one-to-one mapping over the reduced range 0-999 should therefore be used. It is desirable to do this, since it ensures that no repetition of OTTs occurs for input values in the same portion. This helps avoid a scenario when, to use again the example of the first row 400 of FIG. 5, the secret key with ID=9 would normally result in FPE conversion of input value '93' to, say, '27' and input value '97' to, say '37'. In this case, if the full FPE encryption is applied but the value '9' is left as it is, then this would result in two OTT values equal to '97'. Performing FPE encryption over a reduced range so as to not perform FPE enryption on the character in the character position which is to be used for indicating the secret key ID (so, in the case of row 400 of FIG. 5, only performing FPE over the reduced range 0-9 on the second character—so only on '3' for the value '93' and only '7' for the value '97') helps prevent this from happening. In an alternative example, FPE encryption may be performed over the entire range (so on all input characters) and then the secret key ID added as an additional character to the output. Thus, looking again at row 400 of FIG. 5, in this case, FPE encryption would convert the value '93' to '927' (the FPE output value '27' with the secret key ID '9' added at the beginning) and the value '97' to '937' (the FPE output value '37' with the secret key ID '9' added at the beginning). This will again help ensure that the output of the FPE encryption is not repeated for input values in the same portion. In this case, however, it will be appreciated that the output value will have an additional character to the input value.

It will be appreciated that any suitable method of including the identifier of the secret key of a given portion in OTTs generated using that portion may be used, as long as each defined portion uses a secret key with a different identifier and the FPE encryption used for generating OTTs from values in a single portion does produce a particular OTT value more than once for that portion. This latter situation can be avoided, for example, by only applying the FPE over a reduced range and only to the numerical characters of the input values of the sequence which do not identify the secret key. For example, see again the previous example in which the sequence ranges from 0-9999 but the FPE is applied only to the three right-most positioned numerical characters which do not identify the secret key used. Furthermore, the FPE is applied only in the range 0-999 so as to avoid the risk of the same OTT being generated twice in the same portion of the sequence. In this case, collision will be avoided.

As the acquisition of numerical values progresses through the sequence, the previously used keys may be replaced with new ones so that the resulting sequence of output OTTs is forever unpredictable. In this case, any repetition of OTTs will only occur after the entire sequence has been cycled, thus alleviating the problem of OTTs being repeated too early (as can occur with the embodiment of FIG. 3). It is also noted that if a key is deemed to be compromised then the sequence can be advanced to the next portion so that a new key is used. The compromised key can then be replaced.

Figure 6:
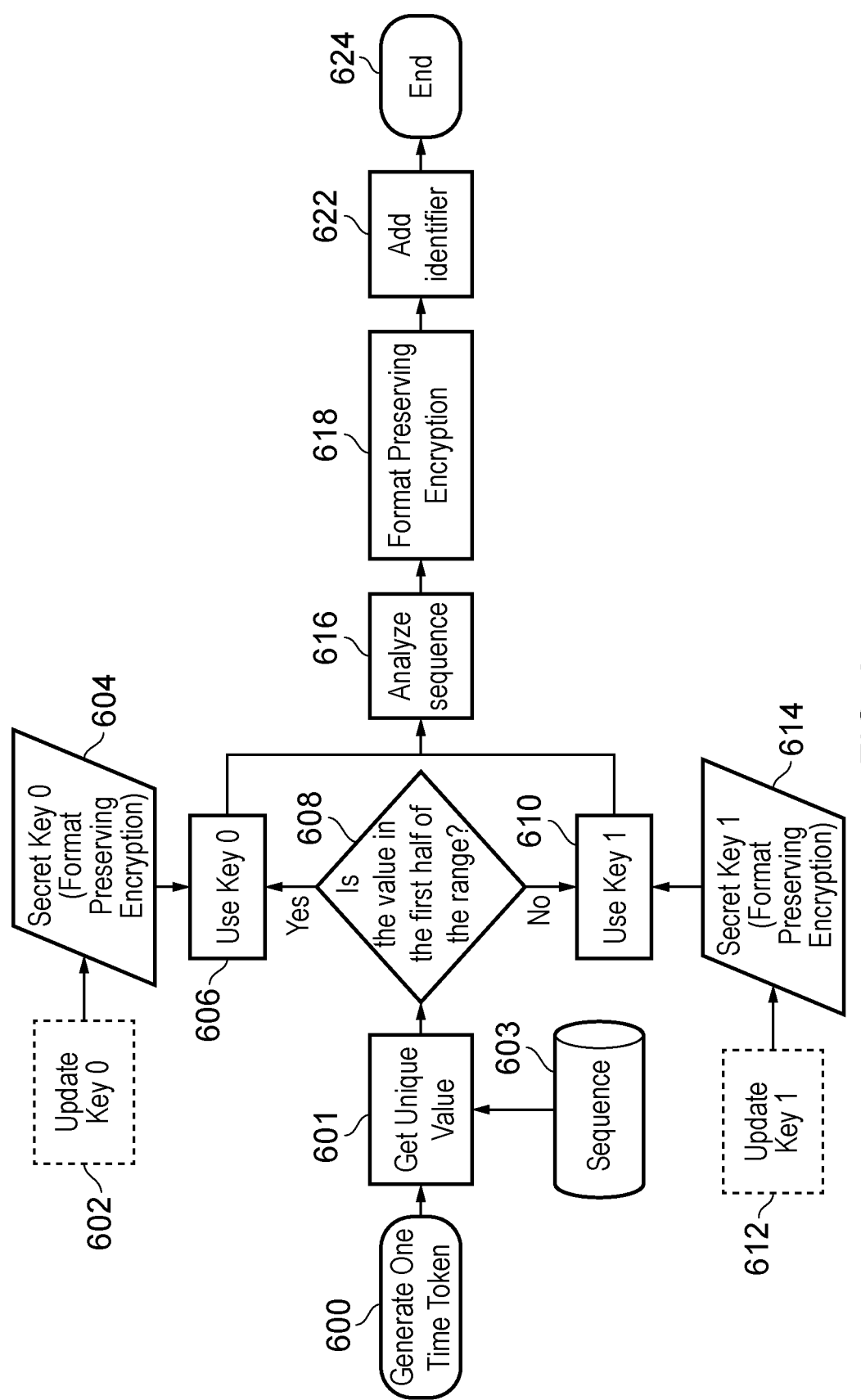
FIG. 6 schematically illustrates a further embodiment according to the present disclosure.

FIG. 6 schematically illustrates a further embodiment of the present disclosure. In this embodiment, there are only two secret keys (identified as 0 and 1) and the encoding of the key identifier is handled by halving the numerical range used in the FPE before doubling the output and adding the key identifier to produce the resulting OTT. This has the effect of ensuring that the OTT in each portion (each portion being a different half of the numerical range) is different from all other OTTs in that same portion or the other portion for a given set of two secret keys. A more detailed explanation of the process of FIG. 6 is now provided.

The process starts at step 600. At step 601, a unique value is obtained from the sequence 603. The sequence 603 is generated by sequence generator 102. At step 608, it is determined whether the obtained value is in the first half of the range. Thus, for example, if the range of the sequence is from 0 to 9999, then if the obtained value is in the range 0 to 4999 then it is determined to be in the first half of the range of the sequence. On the other hand, if it is in the range 5000 to 9999 then it is determined not to be in the first half of the range of the sequence (rather, it is in the second half of the range of the sequence). If the obtained value is determined to be in the first half of the sequence, then the process proceeds to step 606, in which it is determined that the first secret key 604 (secret key 0) should be used. On the other hand, if the obtained value is not determined to be in the first half of the sequence (and must therefore be in the second half of the sequence), then the process proceeds to step 610, in which it is determined that the second secret key 614 (secret key 1) should be used.

The process then proceeds to step 616, in which the value obtained from the sequence is analysed. The process moves then to step 618 where the format preserving encryption is performed on the value. Specifically, if the value is in the range of 0 to 4999 then secret key 0 is used to perform format preserving encryption on the value. However, if the value is in the range of 5000 to 9999 then secret key 1 is used to perform format preserving encryption on the value. The process then moves to step 622. In step 622 an identifier is appended to the encrypted value. Specifically, if secret key 0 was used, then a 0 is appended to the encrypted value. However, if secret key 1 was used, then a 1 is appended to the encrypted value. Of course, although a value is appended to the encrypted value, the disclosure is not so limited and any kind of indicator can be provided. The process then ends at step 624. It is noted that each of the secret keys 604 and 614 may be periodically updated, as previously discussed. This is shown in steps 602 (for secret key 604) and 612 (for secret key 614). For example, the secret keys may be updated after values acquired from the sequence switch from being obtained from the first half of the sequence to the second half of the sequence, and vice versa. Thus, for example, the FPE encryptor 104 will use a first key for secret key 604 as the consecutive values obtained at step 601 from a sequence in the range 0 to 9999 proceed from 0 to 4999 (this being the first half of the range of the sequence). Once the value obtained is 5000 (thus entering the second half of the sequence), the FPE encryptor will start using the secret key 614. After this point, the secret key 604 (which is currently not being used) may be updated in step 602. It is noted that this updated secret key will retain the key identifier ID=0. Values will then continue to be obtained at step 601 from the second half of the sequence until the final value 9999 is reached. After this point, the values obtained will cycle back to the beginning of the sequence (starting from 0) and thus back to the first half. At this point, secret key 604 (which has been newly updated) will be used, and secret key 614 will be updated in step 612. The process thus continues in this way, with the secret keys being changed each time the sequence cycles between the first and second halves of the sequence (the first and second halves of the sequence being different portions of the sequence).

It is noted that the FPE encryption carried out at step 618 by the FPE encryptor 104. The other steps are carried out by the controller 106. Updated secret keys 604 and 614 may be generated by the controller 106 when necessary (using any suitable method for generating secret keys as known in the art) and passed to the FPE encryptor 104 for performing the encryption.

It is noted that although the OTT generation device 100 of embodiments shown in FIG. 1 includes the sequence generator 102, in another embodiment, the sequence generator 102 may instead be a separate entity to the device 100. In this case, the sequence generator 102 may provide sequence values to a plurality of devices 100, in which case, each device is allocated a unique subset of the sequence values for use in generating OTTs. In this sense, each of the devices 100 acts as a separate session, as shown in FIG. 2, for example. In this case, a first device 100 which forms the first session 200A will repeatedly cycle through the numbers 0 to 999 of the overall sequence generated by the sequence generator 102. Similarly, a second device 100 which forms the second session 200B will repeatedly cycle through the numbers 1000 to 1999 of the overall sequence generated by the sequence generator 102. Because each number of the subset of the sequence assigned to each device 100 is still unique, however, each device will be able to generate OTTs in the same way as previously described for the case in which the device 100 itself actually includes the sequence generator 102.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the disclosure.

What is claimed is:

1. A method of generating a plurality of different one time tokens, the method comprising:
    acquiring a first numerical value from a predetermined sequence of consecutive numerical values;
    applying format preserving encryption to the acquired first numerical value to generate a first numerical one time token;
    acquiring a second numerical value from the predetermined sequence of consecutive numerical values, the acquired second numerical value being different than the acquired first numerical value; and applying the format preserving encryption to the acquired second numerical value to generate a second numerical one time token;

wherein the predetermined sequence of consecutive numerical values comprises a first predetermined subset of numerical values and a second predetermined subset of numerical values, each value in the second predetermined subset being different than each of the values in the first predetermined subset.

2. The method according to claim 1, wherein the format preserving encryption is applied to each of the first and second acquired numerical values using the same secret key.

3. The method according to claim 1, comprising:
acquiring the first numerical value from the first predetermined subset and applying the format preserving encryption to the first numerical value using a first secret key to generate the first numerical one time token; and
acquiring the second numerical value from the second predetermined subset and applying the format preserving encryption to the second numerical value using a second secret key to generate the second numerical one time token, wherein an identifier of the first secret key is applied to the first numerical one time token, and wherein an identifier of the second secret key is applied to the second numerical one time token, the identifier of the first secret key being different than the identifier of the second secret key.

4. The method according to claim 3, wherein the identifier of the first secret key is a first numerical character and the identifier of the second secret key is a second numerical character, and wherein the first numerical character is present at a predetermined character position of the first numerical one time token and the second numerical character is present at the same predetermined character position of the second numerical one time token.

5. The method according to claim 4, wherein the numerical character at the predetermined character position is the same for each numerical value in the first predetermined subset and is equal to the first numerical character which serves as the identifier of the first secret key, wherein the numerical character at the predetermined character position is the same for each numerical value in the second predetermined subset and is equal to the second numerical character which serves as the identifier of the second secret key, and wherein the format preserving encryption is not applied to the numerical character at the predetermined character position of either the first numerical value acquired from the first predetermined subset or the second numerical value acquired from the second predetermined subset.

6. The method according to claim 4, wherein the predetermined character position of the first numerical one time token at which the first numerical character, which serves as the identifier of the first secret key, is present is an additional character position not present in the first numerical value acquired from the first predetermined subset, and wherein the predetermined character position of the second numerical one time token at which the second numerical character, which serves as the identifier of the second secret key, is present is an additional character position not present in the second numerical value acquired from the second predetermined subset.

7. The method according to claim 3, wherein after acquiring the first numerical value from the first predetermined subset and applying the format preserving encryption to the first numerical value using the first secret key to generate the first numerical one time token, the first secret key is changed, and wherein after acquiring the second numerical value from the second predetermined subset and applying the format preserving encryption to the second numerical value using the second secret key to generate the second numerical one time token, the second secret key is changed.

8. The method according to claim 1, wherein the predetermined sequence of consecutive numerical values is generated from a predetermined sequence of non-repeating alphabetic values, each numerical value in the predetermined sequence of consecutive numerical values being associated with a respective alphabetic value in the predetermined sequence of alphabetic values via a predetermined one-to-one relationship, and wherein each of the first and second numerical one time tokens is converted to respective first and second alphabetic one time tokens using the predetermined one-to-one relationship.

9. An apparatus for generating a plurality of different one time tokens, the apparatus comprising:
a controller operable to acquire, from a sequence generator, a first numerical value from a predetermined sequence of consecutive numerical values and to acquire, from the sequence generator, a second numerical value from the predetermined sequence of consecutive numerical values, wherein the acquired second numerical value is different than the acquired first numerical value; and
a format preserving encryptor operable to apply format preserving encryption to the acquired first numerical value to generate a first numerical one time token and to apply the format preserving encryption to the acquired second numerical value to generate a second numerical one time token;
wherein the predetermined sequence of consecutive numerical values comprises a first predetermined subset of numerical values and a second predetermined subset of numerical values, each value in the second predetermined subset being different than each of the values in the first predetermined subset.

10. The apparatus according to claim 9, wherein the format preserving encryption is applied to each of the first and second acquired numerical values using the same secret key.

11. The apparatus according to claim 9, wherein the controller is operable to acquire the first numerical value from the first predetermined subset and the format preserving encryptor is operable to apply the format preserving encryption to the first numerical value using a first secret key to generate the first numerical one time token, wherein the controller is operable to acquire the second numerical value from the second predetermined subset and the format preserving encryptor is operable to apply the format preserving encryption to the second numerical value using a second secret key to generate the second numerical one time token, wherein an identifier of the first secret key is applied to the first numerical one time token, and wherein an identifier of the second secret key is applied to the second numerical one time token, the identifier of the first secret key being different to the identifier of the second secret key.

12. The apparatus according to claim 11, wherein the identifier of the first secret key is a first numerical character and the identifier of the second secret key is a second numerical character, and wherein the first numerical character is present at a predetermined character position of the first numerical one time token and the second numerical character is present at the same predetermined character position of the second numerical one time token.

13. The apparatus according to claim 12, wherein the numerical character at the predetermined character position is the same for each numerical value in the first predetermined subset and is equal to the first numerical character, which serves as the identifier of the first secret key, wherein the numerical character at the predetermined character position is the same for each numerical value in the second predetermined subset and is equal to the second numerical character, which serves as the identifier of the second secret key, and wherein the format preserving encryption is not applied to the numerical character at the predetermined character position of either the first numerical value acquired from the first predetermined subset or the second numerical value acquired from the second predetermined subset.

14. The apparatus according to claim 12, wherein the predetermined character position of the first numerical one time token at which the first numerical character, which serves as the identifier of the first secret key, is present is an additional character position not present in the first numerical value acquired from the first predetermined subset, and wherein the predetermined character position of the second numerical one time token at which the second numerical character, which serves as the identifier of the second secret key, is present is an additional character position not present in the second numerical value acquired from the second predetermined subset.

15. The apparatus according to claim 11, wherein after the controller acquires the first numerical value from the first predetermined subset and the format preserving encryptor applies the format preserving encryption to the first numerical value using the first secret key to generate the first numerical one time token, the controller is operable to change the first secret key used, and wherein after the controller acquires the second numerical value from the second predetermined subset and the format preserving encryptor applies the format preserving encryption to the second numerical value using the second secret key to generate the second numerical one time token, the controller is operable to change the second secret key used.

16. The apparatus according to claim 9, wherein the predetermined sequence of consecutive numerical values is generated from a predetermined sequence of non-repeating alphabetic values, each numerical value in the predetermined sequence of consecutive numerical values being associated with a respective alphabetic value in the predetermined sequence of alphabetic values via a predetermined one-to-one relationship, and wherein the controller is operable to convert each of the first and second numerical one time tokens to respective first and second alphabetic one time tokens using the predetermined one-to-one relationship.

17. One or more non-transitory computer-readable storage media having computer-executable instructions embodied thereon, wherein when executed by at least one processor, the computer-executable instructions cause the processor to:
acquire a first numerical value from a predetermined sequence of consecutive numerical values;
apply format preserving encryption to the acquired first numerical value to generate a first numerical one time token;
acquire a second numerical value from the predetermined sequence of consecutive numerical values, the acquired second numerical value being different than the acquired first numerical value; and
apply the format preserving encryption to the acquired second numerical value to generate a second numerical one time token;
wherein the predetermined sequence of consecutive numerical values comprises a first predetermined subset of numerical values and a second predetermined subset of numerical values, each value in the second predetermined subset being different than each of the values in the first predetermined subset.

18. The computer-readable storage media according to claim 17, wherein the computer executable instructions further cause the processor to:
acquire the first numerical value from the first predetermined subset and apply the format preserving encryption to the first numerical value using a first secret key to generate the first numerical one time token; and
acquire the second numerical value from the second predetermined subset and apply the format preserving encryption to the second numerical value using a second secret key to generate the second numerical one time token, wherein an identifier of the first secret key is applied to the first numerical one time token, and wherein an identifier of the second secret key is applied to the second numerical one time token, the identifier of the first secret key being different than the identifier of the second secret key.

19. The computer-readable storage media according to claim 18, wherein after the processor acquires the first numerical value from the first predetermined subset and applies the format preserving encryption to the first numerical value using the first secret key to generate the first numerical one time token, the first secret key is changed, and wherein after the acquires the second numerical value from the second predetermined subset and applies the format preserving encryption to the second numerical value using the second secret key to generate the second numerical one time token, the second secret key is changed.

* * * * *